Figure 1:
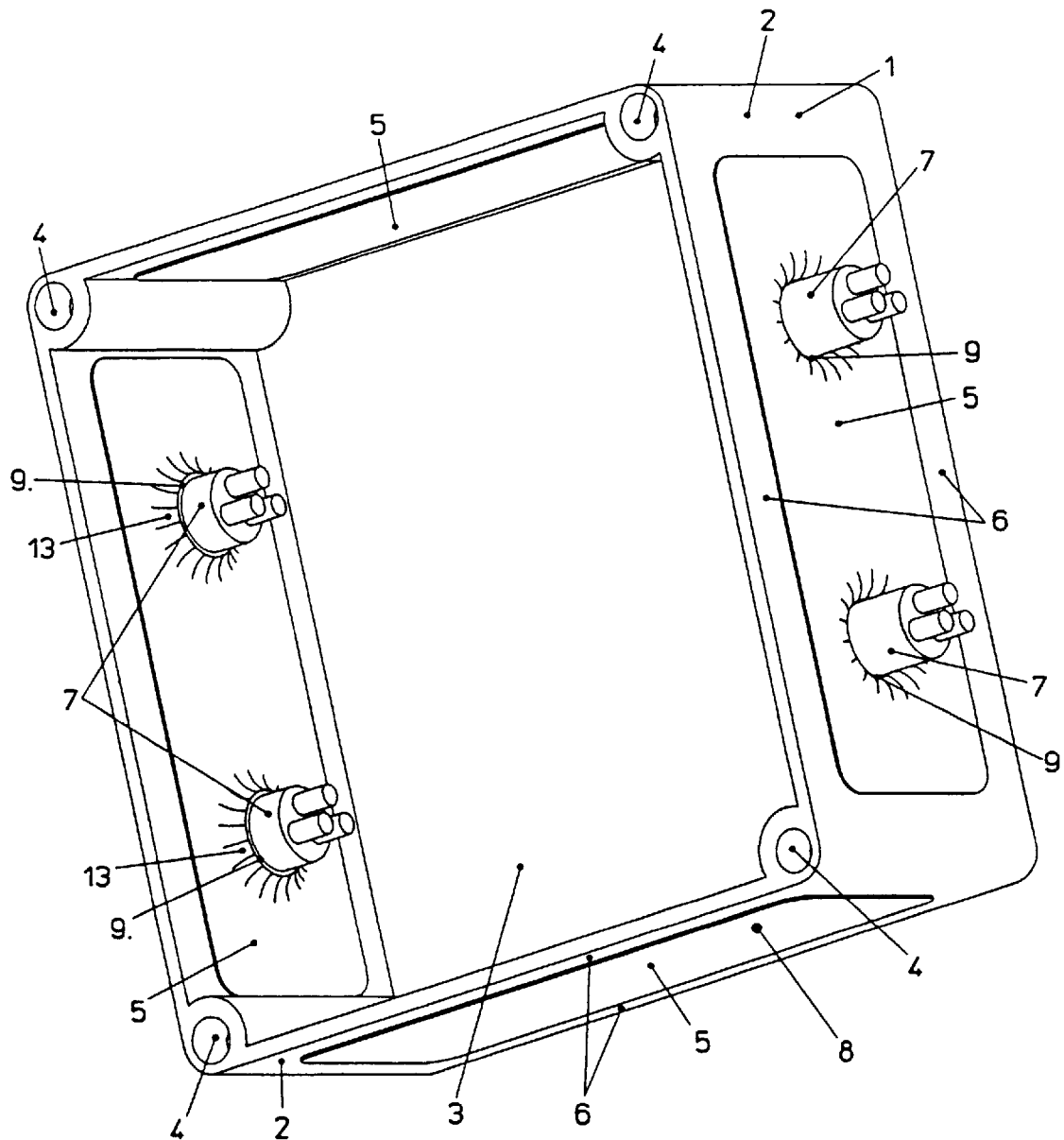

United States Patent [19]
Striebel et al.

[11] Patent Number: 5,814,766
[45] Date of Patent: Sep. 29, 1998

[54] CABLE LEAD-THROUGH

[75] Inventors: Franz Striebel, Schulstrasse; Peter Koch, Ahornallee; Hans Wickermann, Hindenburgstrasse, all of Germany

[73] Assignee: Striebel & John GmbH & Co. KG, Sasbach, Germany

[21] Appl. No.: 424,534

[22] PCT Filed: Oct. 20, 1994

[86] PCT No.: PCT/DE94/01241

§ 371 Date: May 31, 1995

§ 102(e) Date: May 31, 1995

[87] PCT Pub. No.: WO95/12234

PCT Pub. Date: May 4, 1995

[30] Foreign Application Priority Data

Oct. 25, 1993 [DE] Germany .................. 93 16 279 U

[51] Int. Cl.[6] .............. H01B 17/00; H05K 5/00
[52] U.S. Cl. ........................... 174/65 R; 174/151
[58] Field of Search .............. 174/65 R, 65 SS, 174/65 G, 151

[56] References Cited

U.S. PATENT DOCUMENTS 3,873,757  3/1975  Berke et al. .............. 174/65 R X
4,149,028  4/1979  Gressitt et al. ............... 174/65 R

FOREIGN PATENT DOCUMENTS

| 234799 | 6/1983 | Germany | 174/65 G |
| 3915007 | 6/1989 | Germany . | |
| 765686 | 1/1957 | United Kingdom | 174/65 R |
| WO 89/07851 | 8/1989 | WIPO . | |

OTHER PUBLICATIONS

R. W. Stillwagon, Multiflex Cable Exit Air Seal and Insulator, IBM Technical Disclosure Bulletin (vol. 16 No. 7), p.2227, Dec. 1973.

*Primary Examiner*—Hyung S. Sough
*Attorney, Agent, or Firm*—Foley & Lardner

[57] ABSTRACT

In the case of a cable lead-through (5), in particular in panel form, of a pliable material, which is surrounded by a frame (6), in particular for a wall (2) or a ceiling or for a base (3) of a distribution cabinet, a distribution box or a junction box (1) or of a meter cabinet or the like, the cable lead-through (5) is produced from an elastomerically crosslinked material.

9 Claims, 5 Drawing Sheets

CABLE LEAD-THROUGH

BACKGROUND OF THE INVENTION

The invention relates to a cable lead-through, in particular in panel form, for a housing wall, in particular for a wall or a ceiling, or for a base of a distribution cabinet, a distribution box, or a junction box, or of a meter cabinet.

In the case of such cable lead-throughs, it is necessary that the individual cables, of any desired cable cross section, can expediently be led there adequately permanently, in particular permanently flexibly, at any desired point of the cable lead-through surface provided, even in the case of oblique cable running, into such cabinets or boxes. In this case, it is to be ensured that no specific structural preconditions, devices or special tools are required there to prepare for and produce a cable lead-through.

German Patent 3,915,007 discloses a cable lead-through for a housing wall of a distribution box or cabinet or a meter cabinet, in the case of which there is provided a pliable panel, for example of rubber or a thermoplastic, in the solid material of which a multiplicity of clearances of circular cross section are arranged close to one another in a spatially clearly defined alignment, sorted according to cross-sectional size, which clearances have in that case three respectively different sizes for three different cable cross sections; at the same time, there rise above these clearances frustoconical formations, which are produced in one piece from the same pliable material of the panel, and on the tip of which there is formed a raised-out protuberance, or a predetermined breaking point.

This cable lead-through not only suffers from the considerable disadvantage that in that case the individual cable lead-throughs are definitively established by the circular clearances, their spatial position and diametric size on the panel, but also that the frustoconical film-like pliable formations are only limitedly stretchable, with the result that the installation of the cable run is considerably restricted in that case. In addition, due to this limitation of the individual clearances, with regard to the arrangement, number and diametric sizes of the clearances and/or of the associated frustoconical formations, experience shows that in that case a multiplicity of respectively different such cable lead-throughs are required, with the consequently necessary considerable expense on tools and uneconomical stockkeeping with such cable lead-throughs.

In the case of another known such cable lead-through, in that case the planar panel consists of a relatively porous plastic. A cable lead-through is cut into this panel, according to the respective positional and diametric requirements, using a knife or scissors. This type of cable lead-through suffers from the disadvantage that a reliably sealed cable lead-through cannot be achieved in that case. In addition, in that case it has been found in practice that the cable lead-throughs produced manually with great effort and precision often tear open, and thus are unsealed, on account of the only poorly flexible material. Oblique cable lead-ins cannot be produced in a reliably sealed way, or only to a restricted extent. A permanently reliable seal between the cable sheath and the cable lead-through can be achieved only to a considerably restricted extent. In addition, the manual production effort for the precision cutting-out of the individual cable lead-throughs required is inefficient and uneconomical.

The invention is based on the object of providing a cable lead-through of the type mentioned at the beginning which eliminates the disadvantages of the known types and with which an adequate, permanent and reliably sealed cable lead-through can be achieved simply, without special tools and economically at any desired point of the planar cable lead-through and for any cable cross section, even in the case of oblique running of a cable, or installation at a later time.

What is advantageous in the case of this novel cable lead-through in panel form, in particular of a planar design, is not only that in this case, due to the use of a highly stretchable and highly tear-resistant thermoplastic material, in particular a thermoplastic elastomer, cables with relatively large differences in cross section or outside diameter can be led, in an absolutely sealed form-fitting manner, through simple openings, which can be produced relatively inaccurately, in particular so-called auxiliary holes, which are expediently punched in initially at any points, or the required cable lead-in points, but also that the highly stretchable, highly flexible and highly tear-resistant material used there also reliably ensures that even cables running obliquely through the cable lead-through are led with an adequately permanent seal with respect to the outer sheath of the cable. In addition, it is of considerable advantage that this cable lead-through surface can in that case be optimally utilized. Also advantageous is the simple, efficient, expedient and economical thermoplastic production of the novel cable lead-through, which can both be connected to a distribution box, a distribution cabinet, or a junction box, or a meter cabinet, or the like, serving as a wall, base or ceiling, or that, if need be, this cable lead-through is produced as a flange-like individual element, in particular of a one-piece design, having a continuously running-around, reinforced, stable border, or frame, of a correspondingly rigid material, which can be built onto the respective distribution cabinets, distribution boxes, junction boxes or the like.

BRIEF DESCRIPTION OF THE APPLICATION DRAWINGS

Figure 2:
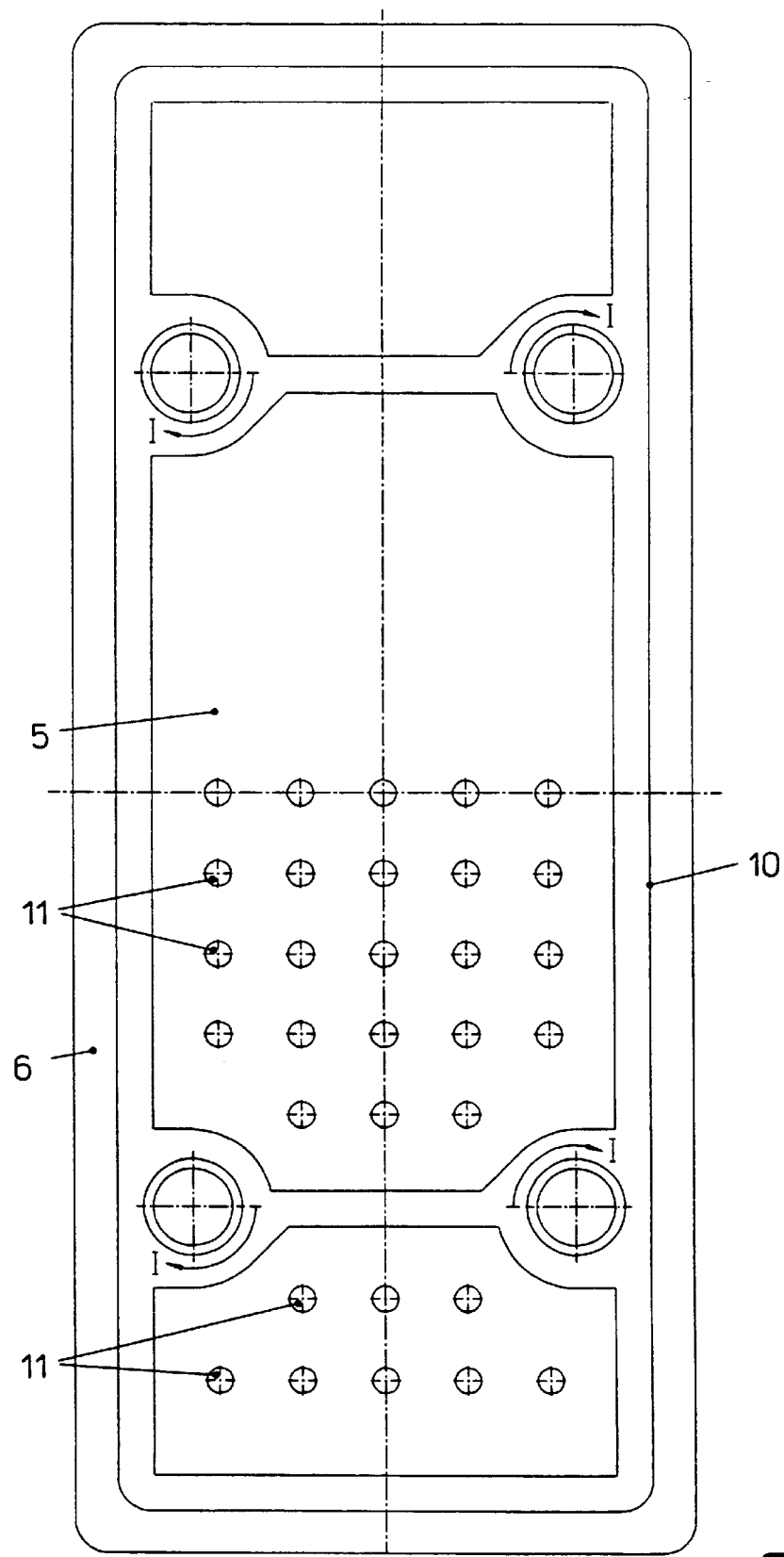
Figure 3:
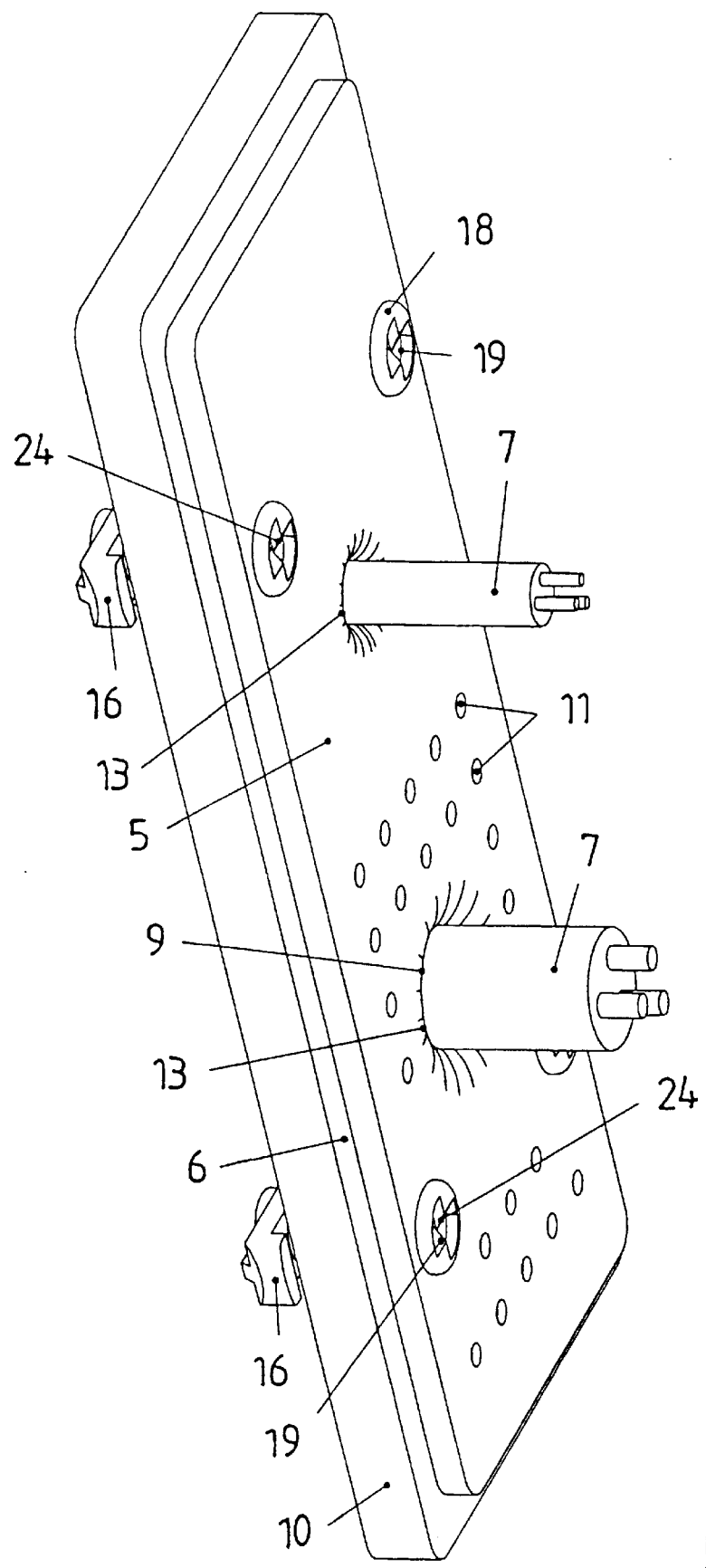
Figure 4:
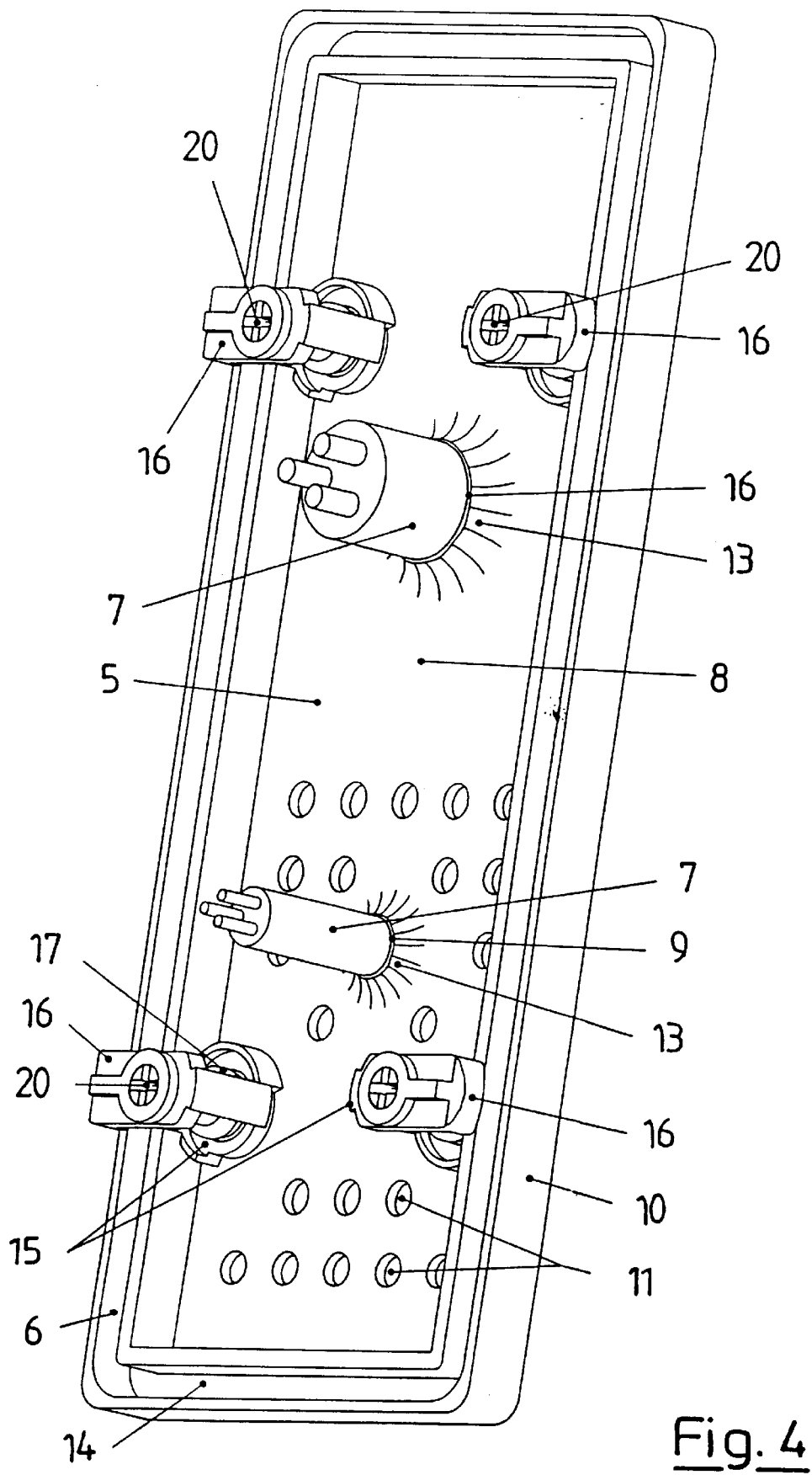
Figure 5:
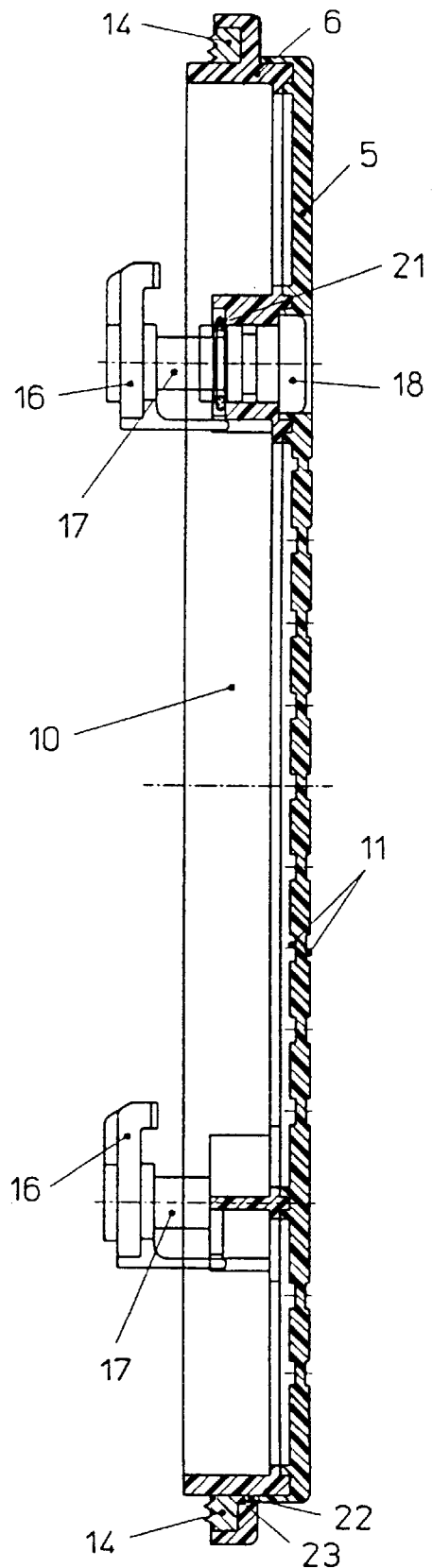

Exemplary embodiments of the invention are explained in more detail below and are represented in the drawings, in which:

FIG. 1 shows a diagrammatic view of a junction box with removed, missing cover and with cable lead-through panels provided on the individual walls, FIG. 2 shows a plan view of a flange-like cable lead-through, in particular for a distribution box or a distribution cabinet, FIG. 3 shows a diagrammatic front view of the cable lead-through according to FIG. 2, FIG. 4 shows a diagrammatic rear view of the cable lead-through according to FIGS. 2 and 3, and FIG. 5 s a longitudinal sectional view through the cable lead-through according to FIGS. 2 to 4.

DETAIL DESCRIPTION OF THE PREFERRED EMBODIMENTS

The open junction box 1, represented in FIG. 1, which is produced from an insulating material and is designed here with a, in particular, square cross section, in this case substantially comprises the four walls 2 and the base 3. 4 denotes assembly fixing holes. 5 shows cable lead-throughs in panel form, which in the region in particular of all four walls 2 are incorporated into the frames 6 provided in particular there. 7 denotes cables which are led through the cable lead-throughs 5, conforming to installation requirements, into the junction box 1.

The cable lead-throughs 5 in panel form are of a highly stretchable, highly flexible and highly tear-resistant, in particular melt-processable, macromolecular material, in particular a thermoplastic elastomer, and are injection-molded into the frames 6 of the walls 2 in one piece, by adhesive or cohesive forces, in particular in an economical production process.

In the case of the intended elastomer, it preferably has a Shore A hardness of 4 to 30 and the elongation at break is 400 to 700%. The tear propagation resistance in the case of such materials may be up to 9 to 14 N/mm. This ensures that a relatively simply produced auxiliary hole 8 of a relatively small diameter, for leading through a relatively thick cable 7, can be stretched relatively far without any problem and reliably, this elastomeric material being able to bear permanently and reliably in a sealed manner against the outer circumference of a cable 7 of any desired cross section with relatively great, highly elastic stress. In this case it is of particular advantage that the cable lead-through surface 9 is permanently relatively pliable.

As FIG. 1 further shows, the surfaces of the cable lead-throughs 5 can be optimally utilized, ie. a leading through of the individual cable cross sections is possible at any desired point of the cable lead-throughs 5.

It is within the scope of the invention here that the junction box 1 shown in FIG. 1 is produced completely from an elastomeric material.

FIGS. 2 to 5 show a cable lead-through 5 of a flange-like design, having a stable border or frame 6 which runs continuously around the outer periphery and is produced in particular from a relatively rigid material. The cable lead-through 5, in panel or sheet-like form, produced in this case from an elastomeric material, is connected in particular in one piece, by adhesive or cohesive forces, to the border or frame 6. In this case, the cable lead-through 5 may be spatially arranged in accordance with the respective configurations, in particular offset in height with respect to the frame 6, as can be seen more specifically from FIGS. 3 to 5. 11 denotes so-called predetermined breaking points, which are arranged on one or both sides, in particular coaxially opposite one another, on the planar cable lead-through 5 at certain points, in particular distributed in a grid-like manner. Such predetermined breaking points 11 may be provided in a punctiform manner and/or in a certain diameter or with different diameters.

In FIGS. 3 and 4, 7 denotes cables of respectively different cross section, which are led through the cable lead-through 5. It is clearly evident there how, depending on the size of the respective cable cross section, there forms in the region of the individual lead-through surfaces 9 a more or less pronounced compressed material distortion 13, which bears flexibly, pressed against the respective cable circumference, reliably and permanently in a sealed manner.

The border or frame 6, in particular of a thermoplastic or thermoset material, is reinforced if need be in a dimensionally stabilizing manner by corresponding metallic or non-metallic inclusions. 14 in this case denotes a peripherally continuous bead-shaped seal, as can be clearly seen from FIGS. 4 and 5, which is produced in particular from the same elastomeric material as the cable lead-through 5. In particular, the seal 14 is formed in one operation together with the production of the cable lead-through 5, as FIG. 5 shows. There it is evident that the cable lead-through 5 and the seal 14 are connected in one piece by means of a web 22 running around intermittently there. For this purpose, corresponding slots 23 are provided in the frame 6 at certain distances from one another.

The production of this flange 10 is expediently performed in this case in a two-stage thermoplastic injection-molding and/or compression-molding process, or by vulcanizing the entirety. In particular, the production of this flange 10 is performed in a so-called sandwich molding process.

15 denotes flange locking devices having the clamping lugs 16 and the associated clamping studs 17. As evident from FIGS. 2 and 3, the front clamping stud heads 18 respectively have countersunk shaped forms 19 for the engagement of a screwdriver. These shaped forms 19 are equipped in particular with a ratchet 24 in such a way that the clamping studs 17 can be actuated by means of a screwdriver only in a certain turning direction, in particular only in the clockwise direction, for pivoting and consequently locking the clamping lug 16 of the locking device 15. Turning the clamping stud 17 in the counterclockwise direction is not possible on account of the shaped forms 19.

Consequently, in particular for technical reasons concerning security and/or sabotage, in this case the locking device 15 can be actuated only by a direct actuation of the clamping lug 16, in particular by means of a corresponding shaped form 20 on the clamping lug 16, ie. from the inside, for example of a distribution cabinet.

The clamping lugs 16 are in this case mounted limitedly such that they are pivotable through about 90° and are in engagement there respectively by means of a screw thread with the rotatably mounted clamping stud 17. This makes it possible to secure the clamping lugs 16, after pivoting in, for example, behind a frame edge (not shown in any more detail here) of a distribution box, or the like, with axially adequate force fitting with respect to such distribution box. 21 denotes a O-ring, as an effective sealing ring between the frame 6 and the respective clamping stud 17, as is also clearly evident from FIGS. 4 and 5.

Such a flange 10 can be retrofitted simply, efficiently, and economically on distribution boxes or cabinets, or the like, especially as only a corresponding rectangular flange break-out is required there. In addition, the flange locking device provided and described, which can be actuated both from the inside and from the outside, can be used for plate thicknesses of the distribution boxes or cabinets, or the like, of in particular 1.5 to 5 mm. Also, in many cases, this novel cable lead-through makes it possible to replace so-called heavy-gauge conduit screwed connections.

It is within the scope of the invention that pipe or tube lead-throughs are also provided instead of cable lead-throughs. The invention is in this case not restricted only to applications in electrical installation engineering, rather it is intended here to use this elastomerically crosslinked material advantageously also for lead-throughs in the sanitary, heating, air-conditioning and hydraulics/pneumatics installation area, in particular in the case of the distribution boxes or flanges often employed there, in particular in the case of flush-mounted heating circuit distributors.

We claim:

1. A cable lead-through for sealably receiving a cable inserted therethrough, comprising:
    a frame; and
    a lead-through panel mounted in said frame, said panel being in the form of a flange provided with a flange locking device having vertically adjustable clamping lugs, said panel being produced from an elastomerically crosslinked, thermoplastic material which is highly stretchable, highly flexible, and highly tear-resistant, said panel being formed with one or more break areas which are smaller in diameter than a cross-sectional diameter of cable to be received, a bead-shaped seal running continuously along the flange, said seal being produced from the same elastomerically crosslinked material and being connected to the lead-through panel, whereby when a cable is inserted through said panel in a region of said break area, the cable passes through the panel distorting the material around the break area, said distorted material around said cable bearing permanently and with high elastic stress against an outer surface of said cable thereby sealing said cable elastically without a need for further sealing.

2. Cable lead-through according to claim 1, wherein said locking device further includes clamping studs having clamping stud heads, said clamping studs actuating said clamping lugs, and wherein said clamping studs are integrally formed with a ratchet engageable by a screwdriver for rotating said lugs.

3. Cable lead-through according to claim 1, wherein said frame is provided in a region of the seal with spaced slot-shaped openings to receive web sections connecting the cable lead-through and the seal.

4. A cable lead-through for sealably receiving a cable inserted therethrough, comprising:

a frame; and a lead-through panel mounted in said frame, said panel being produced from an elastomerically crosslinked, thermoplastic material which is highly stretchable, highly flexible, and highly tear-resistant, said material having a Shore A hardness of 4 to 30, an elongation-at-break property of 400 to 700%, and a tear propagation resistance of 9 to 14 N/mm, said panel being formed with one or more break areas which are smaller in diameter than a cross-sectional diameter of cable to be received, whereby when a cable is inserted through said panel in a region of said break area, the cable passes through the panel distorting the material around the break area, said distorted material around said cable bearing permanently and with high elastic stress against an outer surface of said cables, thereby sealing said cable elastically without a need for further sealing.

5. Cable lead-through of claim 4, wherein said panel is formed with one or more breaking points formed on one or both sides of said panel, said breaking points comprising recesses formed in said panel, said recesses not extending through said panel but weakening the panel to facilitate insertion of cable through said panel in a region of each breaking point.

6. Cable lead-through of claim 5, wherein said breaking points are formed on both sides of said panel opposite one another, said breaking points being arranged in the form of a grid extending over a substantial portion of said panel.

7. Cable lead-through according to claim 4, characterized in that the material of the cable lead-through is melt processable, and produced from a relatively rigid plastic, dimensionally stabilizing material.

8. Cable lead-through according to claim 4, wherein said cable lead-through is connected by adhesive or cohesive forces to the material of the frame.

9. A junction box formed of insulating material and including a plurality of cable lead-throughs for sealably directing cable of varying diameter to the interior of the junction box, each cable lead-through comprising:

a frame; and a lead-through panel mounted in said frame, said panel being produced from an elastomerically crosslinked, thermoplastic material which is highly stretchable, highly flexible, and highly tear-resistant, said material having a Shore A hardness of 4 to 30, an elongation-at-break property of 400 to 700%, and a tear propagation resistance of 9 to 14 N/mm, said panel being formed with one or more break areas which are smaller in diameter than a cross-sectional diameter of cable to be received, whereby when a cable is inserted through said panel in a region of said break area, the cable passes through the panel, distorting the material around the break area, said distorted material around said cable bearing permanently and with high elastic stress against an outer surface of said cable, thereby sealing said cable elastically without a need for further sealing.

* * * * *